United States Patent [19]

Park

[11] Patent Number: 5,240,202
[45] Date of Patent: Aug. 31, 1993

[54] SPOOL BRAKING/RELEASING DEVICE OF FISHING REEL

[75] Inventor: Bo Kook Park, Busan, Rep. of Korea

[73] Assignee: Silver Star Co. Ltd., Busan, Rep. of Korea

[21] Appl. No.: 751,301

[22] Filed: Aug. 28, 1991

[30] Foreign Application Priority Data

Aug. 31, 1990 [KR] Rep. of Korea ............... 13529/1990

[51] Int. Cl.⁵ .......................................... A01K 89/027
[52] U.S. Cl. ................................................... 242/246
[58] Field of Search ............... 242/243, 244, 245, 246

[56] References Cited

U.S. PATENT DOCUMENTS

| | | | |
|---|---|---|---|
| 2,932,464 | 4/1960 | Mauborgne | 242/243 |
| 4,249,706 | 2/1981 | Haselbauer et al. | 242/245 X |
| 4,634,073 | 1/1987 | Coquelet | 242/245 |
| 4,676,451 | 6/1987 | Dispas | 242/245 |
| 4,746,077 | 5/1988 | Toda | 242/245 |
| 4,776,526 | 10/1988 | Saito | 242/245 |
| 4,821,977 | 4/1989 | Schuster | 242/243 X |
| 4,830,307 | 5/1989 | Lassi et al. | 242/245 |
| 4,834,307 | 5/1989 | Larsson et al. | 242/245 |

FOREIGN PATENT DOCUMENTS

| | | | |
|---|---|---|---|
| 429923 | 6/1991 | European Pat. Off. | 242/245 |
| 2230168 | 10/1990 | United Kingdom | 242/243 |

*Primary Examiner*—Joseph J. Hail, III
*Attorney, Agent, or Firm*—Kenyon & Kenyon

[57] ABSTRACT

A spool braking/releasing device which applies a braking force to a spool shaft being in a free rotation state and releases the braking force applied to the spool shaft comprising a braking movable member provided at the rear end of the spool shaft and adapted to move longitudinally of the spool shaft and an actuating lever adapted to move the movable member between its braking position and its releasing position. The actuating lever has a finger grip portion disposed just beneath the fishing rod so that the fisherman can manipulate the actuating lever by using his hand gripping the fishing rod. The actuating lever can be operated by the double manipulation thereof, so that a proper frictional resistance can be applied to the rotating spool shaft. Accordingly, it is possible to easily apply an instant braking force to the spool shaft prior to the manipulation of a handle, depending on the fishing condition. Furthermore, there is no worry about an escaping of the fish and a backlash of the spool which may be caused by unskilled manipulation, thereby enabling the fishing efficiency to be improved.

5 Claims, 5 Drawing Sheets

SPOOL BRAKING/RELEASING DEVICE OF FISHING REEL

BACKGROUND OF THE INVENTION

The present invention relates to fishing reels, and more particularly to a device for applying a brake force to a spool shaft of a fishing spinning reel and releasing the applied brake force from the spool shaft, so as to freely rotate the spool shaft.

An example of spinning reel equipped with such spool braking/releasing device has been disclosed in Japanese Laid-open Patent Publication No. Sho 61-274638. In this patent, the spool braking/releasing device comprises a drag mechanism adapted to apply a resistance force to a spool during the rotation of the spool, a brake mechanism adapted to apply a brake force to a shaft of the spool, so as to prevent the rotation of the spool shaft, an actuating mechanism adapted to selectively operate the brake mechanism, and a mechanism adapted to return the spool shaft which has been maintained at its braking position, by the braking mechanism, to its releasing position.

In this spool braking/releasing device, braking of the spool shaft by the brake mechanism is released in reeling out the fishing line, according to the operation of actuating mechanism, so as to freely rotate the spool shaft. As a result, when a fish takes a bite, the resistance against unwinding of the fishing line can be minimized. In the device, when the fish is caught on a hook, the spool shaft being in its free rotation state is automatically shifted from its released position to braked position by the manipulation of the handle. Accordingly, there is an advantage of avoiding a backlash phenomenon that the fishing is wound in over the spool reversely.

In such conventional spool braking/releasing device, however, when a fish is caught on a hook cast from the spool under the free rotation condition of the spool shaft, the fisherman rotates the handle provided at one side of the reel body so that the return mechanism is operated by the rotation of a drive gear operatively connected to the handle. According to the operation of the return mechanism, the braking mechanism is shifted to its braking position, so as to brake the rotation of spool shaft.

In the case that the fish is caught on the hook, therefore, a braking force should be applied to the spool shaft by rotating rapidly the handle, so as to prevent the spool shaft from being rotated. If the manipulation of handle is delayed, there is a problem that the fish caught on the hook can not be easily captured, because it can take a time for hiding in waterweed or rock gap. Also, when the handle is rotated during rapid escaping of the caught fish, a sudden braking force is applied to the spool rotating in the direction of unwinding the fishing line. As a result, the fishing line may break due to an excessive tension applied thereto. Otherwisely, the mouth portion of the fish caught on the hook may be separated.

Generally, when the fish taking a bite escapes suddenly, the fisherman does not manipulate the handle, but strikes the fishing rod unconsciously, thereby occurring a severe backlash of the spool.

Due to the above-mentioned problems, in the case of a spinning reel equipped with the conventional spool braking/releasing mechanism, the handle should be manipulated rapidly as soon as a fish is caught on the hook, so as to brake the rotation of the spool shaft. Even during winding in the fishing line, the braking mechanism should be shifted from its braking position to its releasing position, depending on the fishing condition. Otherwisely, the frictional resistance applied to the spool by the drag mechanism should be frequently adjusted. Consequently, the conventional spool braking-/releasing mechanism having the above-mentioned construction has a problem that it can not rapidly deal with an urgent situation.

That is, if the braking mechanism has to be shifted to its braking position, so as to apply a braking force to the spool shaft, the fisherman should grip the fishing rod with one hand and rotate the handle provided at one side of the reel body with the other hand. On the other hand, in the case of shifting the braking mechanism from its braking position to its releasing position, the fisherman should manipulate the actuating lever of actuating mechanism connected to the rear end of reel body, in the same manner. However, even a skilled fisherman can not rapidly and easily manipulate the handle or the actuating lever by using his one hand, under the condition of gripping the fishing rod with the other hand. This difficulty in manipulation causes the fishing efficiency to be greatly reduced.

SUMMARY OF THE INVENTION

Therefore, an object of the invention is to provide a spool braking/releasing device of a fishing reel capable of eliminating the above-mentioned disadvantages and problems encountered in the prior art.

Another object of the invention is to provide a spool braking/releasing device of a fishing reel wherein the manipulation of an actuating lever for releasing the braking of a braking mechanism can be accomplished by using only one hand of the fisherman, thereby enabling rapid and easy shift of the braking mechanism to its releasing position where the spool shaft can freely rotate.

Still another object of the invention is to provide a spool braking/releasing device of a fishing reel wherein under the condition that a braking mechanism has been shifted to its releasing position by a primary manipulation of an actuating mechanism, an actuating lever of the actuating mechanism is secondarily manipulated to occur a proper frictional resistance against free rotation of the spool shaft, so that an instant braking force is easily applied to the spool shaft prior to the manipulation of the handle, depending on the fishing condition.

In order to accomplish these objects, the present invention provides a spool braking/releasing device of a fishing reel comprises a reel body having a stem adapted to connect the reel body to a shoe for attaching the fishing reel to a fishing rod, a spool shaft extending longitudinally within said reel body and provided at its front end with a well-known type front drag mechanism, a handle, a drive gear disposed within the reel body and operatively connected to the handle so as to rotate according to the rotation of the handle and a cover plate constituting a side wall of the reel body, said device comprising: a braking mechanism adapted to selectively brake the rotation of spool shaft and including a fixed member fixedly mounted to the rear end of the reel body and a movable member connected to the rear end of the spool shaft to rotate together therewith and slide longitudinally of the spool shaft between a braking position at which it engages 7ith said fixed member to brake the rotation of spool shaft and a releasing position at which it allows the rotation of spool shaft; an actuating mechanism adapted to shift the braking mechanism between its braking position and its releasing position and including an actuating lever arranged to be manipulated by the hand of fisherman gripping the fishing rod and an actuating plate pivotally connected to the rear end of said actuating lever, by means of a link, and adapted to move the movable member of braking mechanism, said actuating lever being double manipulated to primarily shift the movable member to its braking position or secondarily apply a frictional resistance to the rotating movable member; and a return mechanism adapted to return the braking mechanism from its releasing position to its braking position according to the rotation of the handle and thus the drive gear and including a kicking plate disposed at the inner surface of the cover plate and adapted to operatively connected to the drive gear so as to selectively slide, a pair of rotation arms operatively connected to said link of the actuating mechanism, one of said rotation arms being rotated according to the sliding movement of said kicking plate so as to move the link and thus the actuating plate in the direction of forcing the movable member of the braking mechanism to slide to its braking position and the other being adapted to return the kicking plate to its original position.

The fixed member of the braking mechanism is provided with a plurality of engaging grooves. On the other hand, the movable member of the braking mechanism is provided at its middle portion with a plurality of engaging protrusions selectively engagable in said engaging grooves of the fixed member and at its front portion with an annular contact piece which is selectively in contact with a braking washer provided at the inner surface of the reel body to apply the frictional resistance to the rotating movable member.

The actuating lever of the actuating mechanism has a curved middle portion pivotally supported to the middle portion of the stem of reel body and a finger grip portion disposed below the shoe of reel body.

The actuating plate of the actuating mechanism has a middle portion interposed between said contact piece and the engaging protrusions of the movable member and a lower end supported to the lower surface of the reel body by means of a pivot so as to pivot the actuating plate forwardly and backwardly about said pivot. The actuating plate also has arc-shaped front and rear contacts formed at both sides of the middle portion of movable member, respectively. The contacts are protruded in opposition to each other and contactable to the contact piece and the engaging protrusions of the movable member, respectively.

Since the actuating lever of actuating mechanism is disposed just beneath the fishing rod, the fisherman can manipulate it by using his hand gripping the fishing rod so that the spool shaft can be rapidly shifted to its free rotation position. Accordingly, the fishing efficiency can be improved even under bad or difficult conditions.

In particular, since the actuating lever which has been primarily pulled to maintain the spool shaft 2 at its free rotation state can be slightly more pulled so as to press the contact piece of the movable member against a support member of the reel body, a proper frictional resistance can be applied to the movable member and the spool shaft which rotate according to the unwinding of fishing line. That is, the fisherman can brake preliminarily the rotation of spool shaft, without manipulating the handle as in the prior art. Therefore, he can afford to manipulate the handle so that he can stably wind in the fishing line. As a result, there is no problem caused by the delayed manipulation of handle. That is, there is no worry about that the fish caught on the hook can take a time for escaping.

BRIEF DESCRIPTION OF THE DRAWINGS

The above and other objects and features will be more readily understood by reference to the following detailed description and the accompanying drawings.

FIGS. 2A to 2D are partial sectional views explaining operations of the spool braking/releasing device according to the present invention, wherein FIG. 2A shows the condition that the braking force of a braking mechanism is applied to a spool shaft, FIG. 2B shows the condition that the braking force of braking mechanism applied to a spool shaft is released by a primary operation of an actuating lever, FIG. 2C shows the condition that a frictional resistance is applied to the spool shaft by a secondary operation of the actuating lever, and FIG. 2D shows the condition that the braking mechanism is shifted to its braking position by an operation of a return mechanism caused by the rotation of handle.

DETAILED DESCRIPTION OF THE PREFERRED EMBODIMENTS

Figure 1:
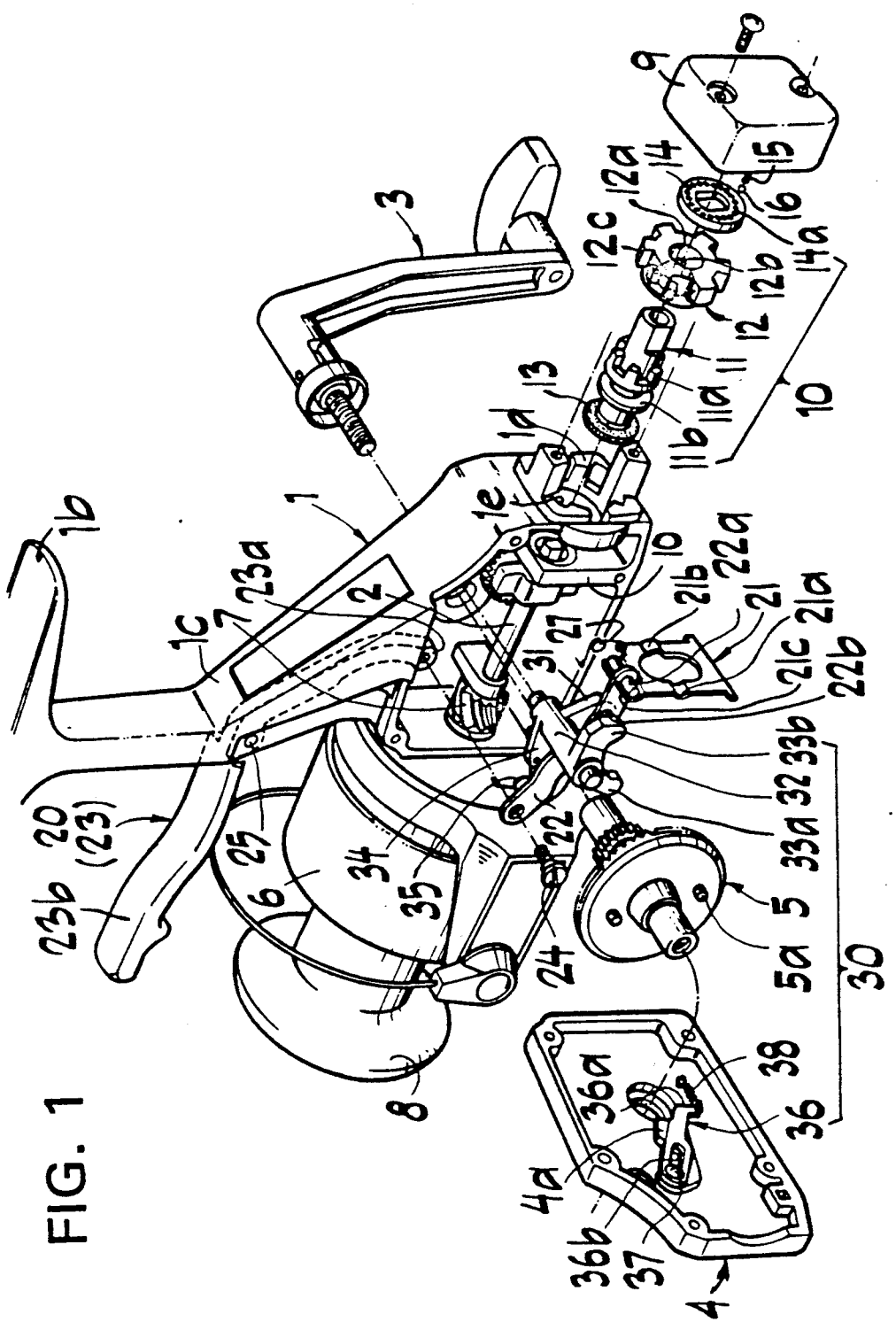
FIG. 1 is a partially exploded perspective view of a fishing reel with a spool braking/releasing device according to the present invention.

FIG. 1 is an exploded perspective view of a spinning type fishing reel with a spool braking/releasing device according to the present invention, while FIG. 2 is a sectional view of the fishing reel shown under the assembled condition. As shown in the drawings, the fishing reel comprises a reel body 1, a spool shaft 2 provided at its front end with a well-known type front drag mechanism (not shown), a handle 3, and a cover plate 4 constituting a side wall of the reel body 1. The reel body 1 has a support member 1a formed near the rear end of the reel body 1, a stem 1c which connects the reel body 1 to a shoe 1b. The shoe 1b is used to attach the reel to a fishing rod. To the spool shaft 2, a spool 6 is fixedly mounted.

In accordance with the present invention, the spool braking/releasing device comprises a braking mechanism 10 disposed between the rear end of the spool shaft 2 and the rear end of the reel body 1 and adapted to selectively brake the rotation of spool shaft 2, an actuating mechanism 20 adapted to move the braking mechanism 10 between its braking position and its releasing position, and a return mechanism 30 /peratively connected with the actuating mechanism 20 and adapted to return the braking mechanism 10 from its releasing position to its braking position, according to the rotation of handle 3.

Figure 3:
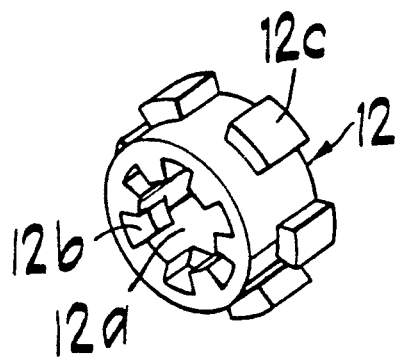
FIG. 3 is a perspective view of a fixed member of the braking mechanism according to the present invention.

The braking mechanism 10 includes a cylindrical movable member 11 connected to the rear end of the spool shaft 2 to rotate together therewith and longitudinally slide therealong and provided at its middle portion with a plurality of engaging protrusions 11a and at its front portion with an annular contact piece 11b, a fixed member 12 fixedly mounted to the rear end of the reel body 1 and provided with an axial hole 12a receiving the rear end of the movable member 11 and a plurality of inner engaging grooves 12b (FIG. 3) engagable with the engaging protrusions 11a of the movable member 11, and a braking washer 13 interposed between the contact piece 11b of the movable member 11 and the support member 1a which is formed in the reel body 1 near the rear end of the reel body 1 and adapted to support the front end of the movable member 11. When the movable member 11 is maintained at its rear position where its engaging protrusions 11a engage in inner engaging grooves 12b of the fixed member 12, the movable member 11 and the spool shaft 2 connected therewith are prevented from rotating. When the movable member 11 moves to its front position, its engaging protrusions 11a are disengaged from inner engaging grooves 12b of the fixed member 12. At this state, the movable member 11 together with the spool shaft 2 can freely rotate.

The actuating mechanism 20 which switches the braking mechanism 10 between the braking position and the releasing position comprises an actuating plate 21 having a middle portion interposed between the contact piece 11b and the engaging protrusions 11a of the movable member 11 and a lower end supported to the lower surface of the reel body 1, said actuating plate 21 being pivotable forwardly and backwardly about a pivot P, a link 22 disposed above the spool shaft 2 to extend longitudinally and provided with a rear end pivotally connected to the upper end of the actuating plate 21 and a front end disposed below the stem 1c of the reel body 1, and an actuating lever 23 having a rear end 23a pivotally connected to the front end of the link 22 and a free front end provided with a finger grip portion 23b disposed below the shoe 1b of the reel body 1.

The actuating plate 21 surrounds the portion of movable member 11 between the contact piece 11b and the engaging protrusions 11a of the movable member 11. At both sides of the middle portion of movable member 11, arc-shaped front- and rear contacts 21a and 21b are formed, which are protruded in opposition to each other and contactable to the contact piece 11b and the engaging protrusions 11a of the movable member 11, respectively. A torsion spring 27 is disposed between one side of the upper portion of the actuating plate 21 and the inner surface of the upper portion of reel body 1. The torsion spring 27 functions to always urge the actuating plate 21 rearwardly, that is in the direction that the arc-shaped rear contact 21b is in contact with the protrusions 11a.

The link 22 is provided at its middle portion with a slot 22b in which a connecting pin 31a provided at a connecting member 31 of the return mechanism 30 is received, as will be described in detail hereinafter.

The connection between the actuating plate 21 and the link 22 is provided by an actuating pin 22a mounted to the rear end of the link 22 and a curved engaging piece 21c formed at the upper end of the actuating plate 21. The pivotal connection between the front end of link 22 and the end 23a of actuating lever 23 is provided by a screw 24.

The actuating lever 23 is supported at its curved middle portion to the middle portion of the stem 1c of reel body 1, by means of an axial pin 25. Accordingly, as the finger grip portion 23b of actuating lever 23 is raised upwardly, the link 22 connected to the rear end of actuating lever 23 is moved forwardly, so that the actuating plate 21 connected to the rear end of link 22 can be pivoted forwardly.

In the drawings, the reference numeral "26" designates a torsion spring fitted around the axial pin 25 supporting the actuating lever 23. Both ends of the torsion spring 26 are supported to the stem 1c of reel body 1 and the actuating lever 23, thereby causing the spring 26 to apply a return force to the actuating lever 23 which has been raised upwardly.

On the other hand, the return mechanism 30 which functions to return the braking mechanism 10 from its releasing position to its breaking position comprising a rotation shaft 32 rotatably supported at its both ends to the inner surface of the cover plate 4 and the inner surface of the side wall of reel body 1 faced to the cover plate 4, respectively, and a connecting member 31 extending downwardly from the middle portion of said rotation shaft 32 and connected to the link 22 of actuating mechanism 20, by means of the above-mentioned connecting pin 31a providing at the lower end of said connecting member 31 and slidable engaged in the slot 22b of the link 22 of actuating mechanism 20. At one end of the rotation shaft 32 which is supported to the cover plate 4, front and rear actuating arm 33a and 33b are provided which are curved to have a certain curved shape. A torsion spring 35 is disposed between a support 34 extending from the other end of the shaft 32 and the inner surface of the upper 7all of reel body 1. The torsion spring 35 has a resilience slightly higher than that of the torsion spring 27 provided at the actuating plate 21.

A drive gear 5 is disposed within the reel body 1 and operatively connected to the handle 3, so as to rotate according to the rotation of the handle 3. The drive gear 5 has a pair of kicking lugs 5a at the surface facing to the inner surface of the cover plate 4. Below the middle portion of the cover plate 4, a kicking plate 36 is disposed at the inner surface of the cover plate 4. The kicking plate 36 has at one end thereof a slot 36b receiving a screw 37 mounted to the cover plate 4 so that it can slide and pivot with respect to the screw 37. The kicking plate 36 also has at the other end thereof an engagement jaw 36a which is engagable with the kicking lugs 5a of the drive gear 5. A tension spring 38 is disposed between the other end of the kicking plate 36 and the cover plate 4, so as to always urge the kicking plate 36 forwardly. In order to guide and limit the sliding movement and the pivot movement of the kicking plate 36, the cover plate 4 has a guide protrusion 4a.

In the drawings, the reference numeral "7" designates a pinion which is mounted to the spool shaft 2 and engaged with the drive gear 5 to rotate the rotor 6. The reference numeral "8" designates a spool, "9" a back cover coupled to the rear end of the reel body 1, and "14" a click washer fixedly mounted around the rear end of the movable member 11 extending rearwardly beyond the fixed member 12, to rotate together with the movable member 11. The click washer 14 has at the rear surface thereof a plurality of grooves 14a. In the rotation of click washer 14, the grooves 14a are sequentially in contact with a ball 16 which is resiliently mounted to the inner surface of back cover 9 by means of a spring 15, thereby occurring clicking sound.

The reference numeral "1e" designates a mounting hole formed at the rear end of the reel body 1, in which a fixing member 1d for fixing the fixed member 12 is fitted. On the other hand, the character "R" designates a fishing rod to which the reel is attached by means of the shoe 1b.

Operation of the spool braking/releasing device according to the present invention will now be described in detail.

Figure 2A:
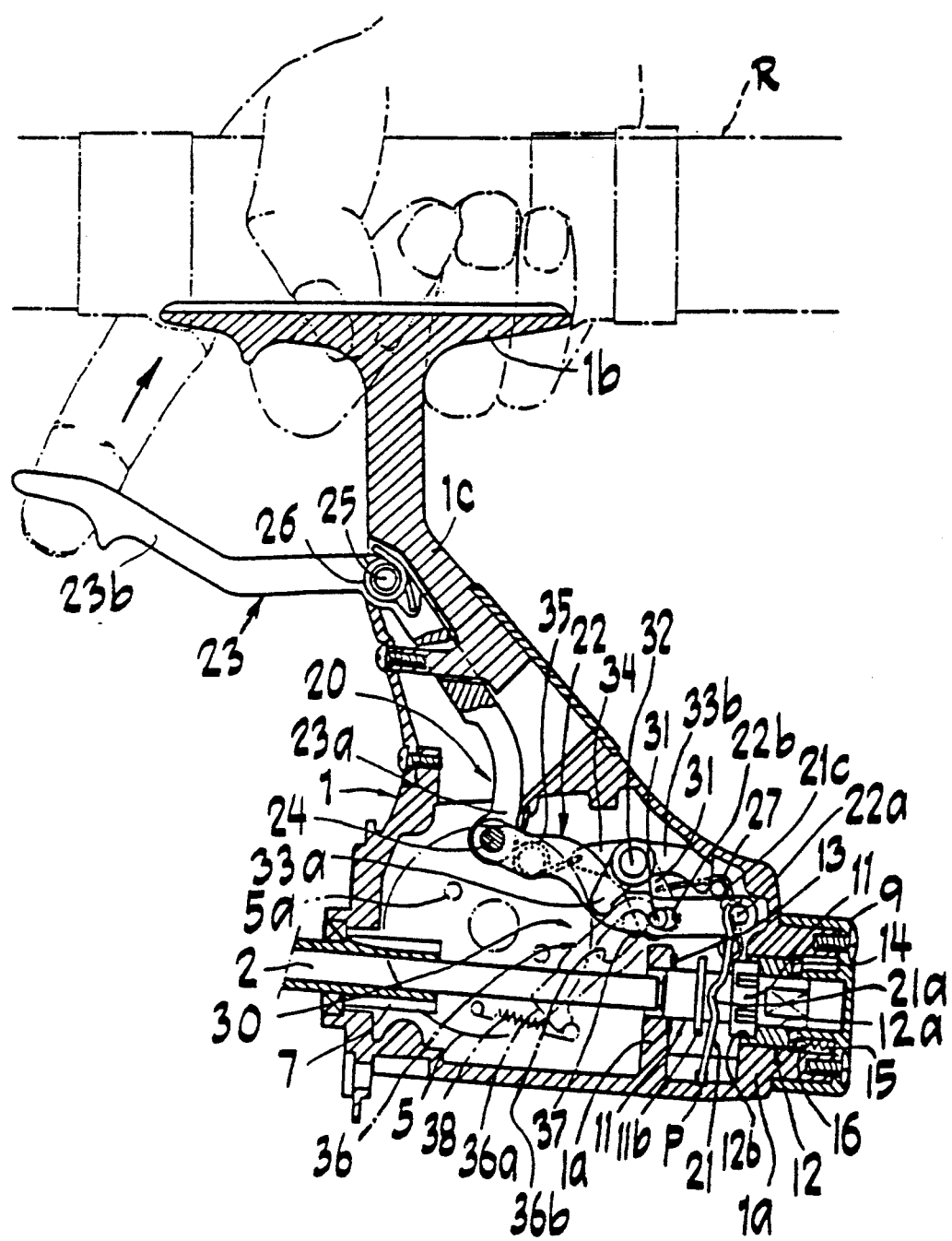

FIG. 2A shows the condition that the braking force of the braking mechanism has been applied to the spool shaft 2 so that the spool shaft 2 can not rotate. At this time, the actuating lever 23 of the actuating mechanism 20 is maintained at the condition that it has been moved downwardly, while the link 22 connected with the rear end of the actuating lever 23 is maintained at the condition that it has been moved rearwardly. On the other hand, the actuating plate 21 connected with the link 22 is maintained at the condition that it has been pivoted rearwardly about the pivot P disposed at the lower end thereof. According to this pivotal movement of the actuating plate 21, the movable member 11 of the braking mechanism 10 connected to the spool shaft 2 is maintained at its rear position where the engaging protrusions 11a of the movable member 11 are engaged in the inner engaging grooves 12b of the fixed member 12. As a result, the movable member 11 and the spool shaft 2 can not rotate.

When the braking mechanism 10 is to be moved from its braking position to its releasing position at which the spool shaft 2 can freely rotate, in order to pay out the fishing line from the spool 8, the fisherman who grips the fishing rod R and the shoe 1b of the reel body 1 attached to the fishing rod R with his one hand (in the case shown in FIG. 2A, left hand), as shown by the phantom line in FIG. 2A, uses his forefinger to pull up the actuating lever 23 of the actuating mechanism 20 in the upward direction indicated by the arrow in the drawing. According to this manipulation, the actuating lever 23 pivots about the axial pin 25 to move the link 22 connected to its rear end forwardly. Therefore, the actuating plate 21 connected to the rear end of link 22 pivots forwardly about the pivot P and pushes the contact piece 11b of the movable member 11 forwardly by its front contact 21a, thereby causing the movable member 11 to move forwardly. As a result, the engaging protrusions 11a of the movable member 11 which have been engaged in the inner engaging grooves 12b of the fixed member 12 are disengaged therefrom.

Under this condition, the spool shaft 2 can rotates together with the movable member 11. At this time, the spool 8 mounted to the front end of the spool shaft 2 can also rotate freely, irrespective of the magnitude of the braking force generated by the front drag mechanism, so that the fisherman can easily cast the fishing line with a hook. Since the fishing line can be easily paid out from the spool 8, in virtue of smooth rotation of the spool shaft 2, it is possible to provide and maintain the condition that the fish can take naturally a bite put on the hook.

As the fishing line is paid out from the spool 8, because the fish has been caught on the hook, the spool shaft 2, the movable member 11 and the click washer 14 rotate, so that clicking sound occurs. From the clicking sound, the fisherman recognizes that the fish has been caught on the hook. Then, he strikes the fish by instantly lifting the fishing rod R or instantly rotating the reel hand 3 to wind in the fishing line, in a well-known manner.

According to the arrangement of the spool braking-/releasing device of the present invention, the actuating lever 23 of the actuating mechanism 20 is disposed just beneath the shoe 1b so that the fisherman can easily manipulate the actuating lever 23 by using the forefinger of his hand grasping the fishing rod R. Furthermore, the hereinafter described double manipulation of the actuating lever 23 can provide instant braking of the spool shaft 2. The double manipulation includes the above-mentioned primary manipulation that the fisherman pulls up the actuating lever 23 by using his forefinger to disengage the engaging protrusions 11a of the movable member 11 from the inner engaging grooves 12b of the fixed member 12 and the secondary manipulation that he further pulls up the actuating lever 23, which has been raised as above, in the same manner. By the latter manipulation, an instant braking force is applied to the rotating spool shaft 2, thereby avoiding a backlash phenomenon of the spool shaft 2 which may be caused by a sudden striking of the fishing rod and an escaping of the fish which may be caused by the delayed manipulation of the handle 2. This manipulation will be described in detail hereinafter.

Figure 2B:
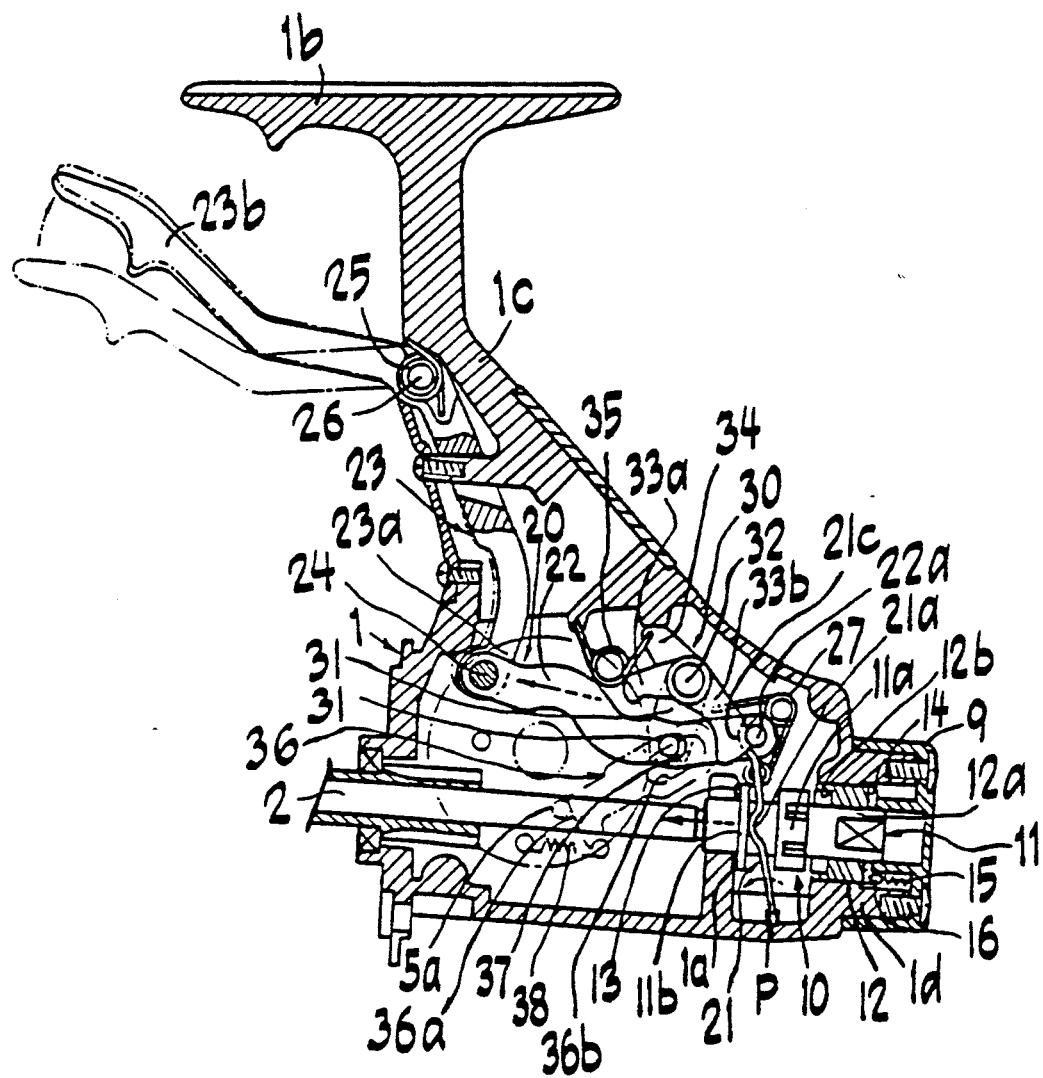
Figure 2C:
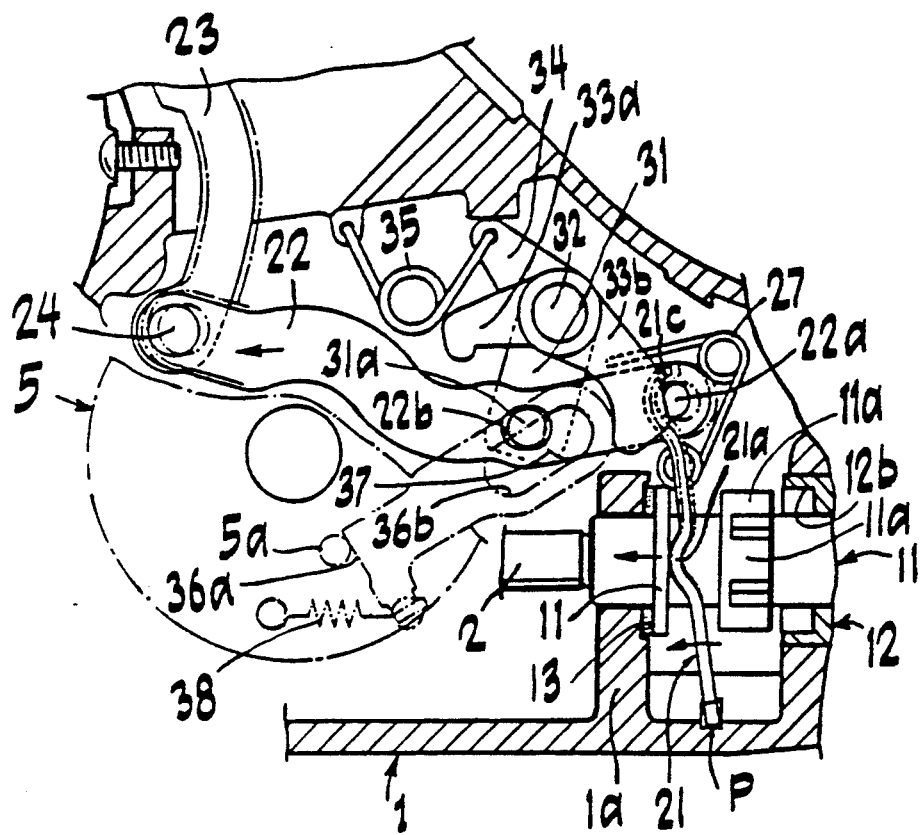

As the actuating lever 23 which has been primarily raised to maintain the spool shaft 2 at its free rotation state, as shown by the solid line in FIG. 2B, is further pulled up to be slightly more raised as shown by the phantom line in FIG. 2B, the actuating lever 23 and the link 22 which have been maintained at the positions shown by the phantom line in FIG. 2C move to their positions shown by the solid line in FIG. 2C, respectively, thereby causing the actuating plate 21 to move further forwardly. According to the forward movement of the actuating plate 21, the contact piece 11b moves forwardly and presses against the braking washer 13 disposed between the contact piece 11b of the movable member 11 and the support member 1a. The pressing force generates a frictional resistance at the rotating movable member 11.

As a result, the fisherman can apply an instant braking force to the rotating movable member 11 and the rotating spool shaft 2, without manipulating the handle 3. Therefore, he can afford to manipulate the handle 3 so that he can stably wind in the fishing line under the condition the braking of the spool shaft 2 is perfectly accomplished by the braking mechanism 10.

Figure 2D:
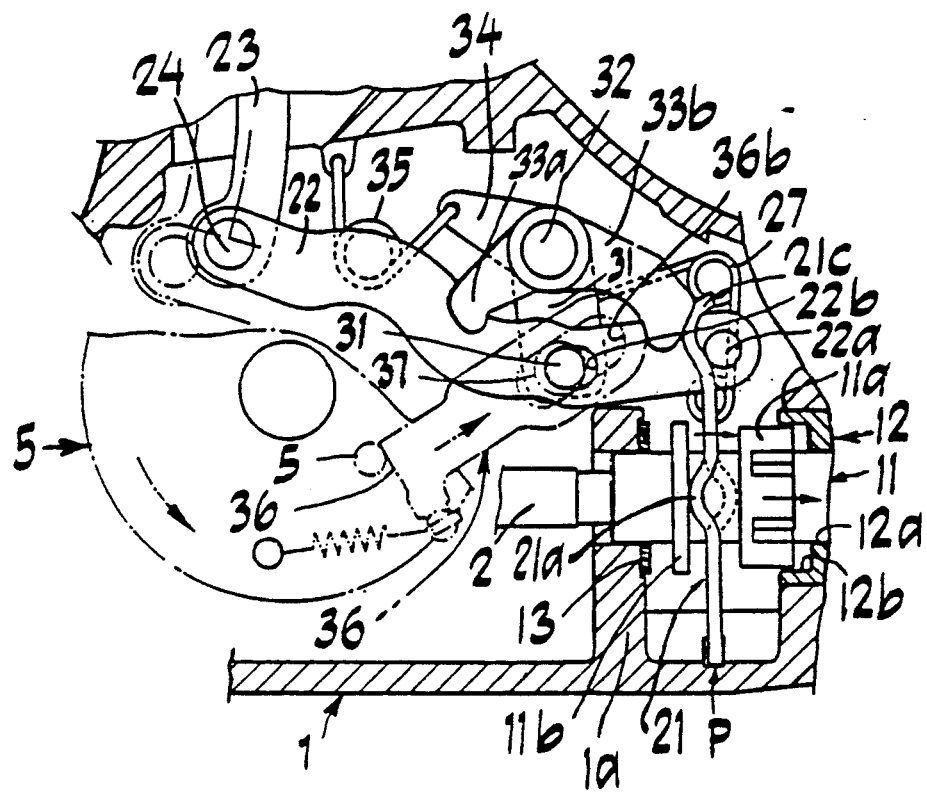

Referring to FIG. 2D, there is illustrated the operation of applying the braking force by the manipulation of the handle 3.

As the handle 3 rotates under the condition that the braking force applied to the spool 2 by the braking mechanism 10 is released, as shown in FIG. 2B, the drive gear 5 connected to the shaft of the handle 3 is rotated in anticlockwise, as shown in FIG. 2D, so that one of kicking lugs 5a formed on the drive gear 5 rotates in the same direction and pushes the engagement jaw 36a of kicking plate 36 of the return mechanism 30 which is arranged in the rotation path of the kicking lugs 5a. Consequently, the tension spring 38 is stretched and the kicking plate 36 slidably supported to the screw 37 is moved in the direction indicated by the arrow in FIG. 2D.

According to the movement of kicking plate 36, the rear end of kicking plate 36 is pressed against the rear actuating arm 33b formed at the rotation shaft 32, thereby causing the rear actuating arm 33b and thus the rotation shaft 32 to rotate rearwardly. At this time, the connecting member 31 depending from the middle portion of the rotation shaft 32 also rotates rearwardly, so that the connecting pin 31a provided at the lower end of connecting member 31 rotates in the same direction. As a result, the link 22 of actuating mechanism 20 connected to the connecting member 31 via the connecting pin 31a pivots rearwardly.

This pivotal movement of link 22 causes the actuating lever 23 connected to the rear end of link 22 to return to the state shown in FIG. 2A. Also, the actuating pin 22a mounted to the rear end of link 22 is disengaged from the curved engaging piece 21c formed at the upper end of the actuating plate 21, thereby causing the actuating plate 21 to pivot rearwardly about the pivot P, by virtue of the spring force of torsion spring 27. According to the pivotal movement of actuating plate 21, the arc-shaped rear contact 21b is pressed against the engaging protrusions 11a of movable member 11 so that the movable member 11 is moved rearwardly. As a result, the engaging protrusions 11a of movable member 11 are engaged in the inner engaging grooves 12b of fixed member 12, as shown in FIG. 2A, thereby preventing the movable member 11 and thus the spool shaft 2 from being rotated.

On the other hand, under the condition that the rotation of spool shaft 2 has been stopped by the operations of the return mechanism 30 and the braking mechanism 10, the free end of arc-shaped front actuating arm 33a of the rotation shaft 32 is pressed downwardly against the lifted rear portion of kicking plate 36 by the spring force of torsion spring 35 applied to the support 34 of the return mechanism 30 so that the kicking plate 36 is shifted a certain distance, so as to leave from the rotation path of kicking lugs 5a of the drive gear 5. At this state, the fishing line can be freely wound in, without interfering the rotation of drive gear 5 in manipulating the handle 3.

In the case when the braking force applied to the spool shaft 2 is to be suddenly released, during winding in the fishing line, the fisherman who grips the fishing rod R with /ne hand and the handle 3 with the other hand manipulates the actuating lever 23 with the hand gripping the fishing rod R to release instantly the braking force applied to the spool shaft 2. At this state, if the fisherman further manipulates the actuating lever 23 so as to perform its secondary operation, a proper frictional resistance is applied to the spool shaft 2 so that the force effecting the spool shaft 2 due to the pulling of the caught fish can be rapidly and easily adjusted, depending on the kind and the size of caught fishes and the fishing condition.

In the above embodiment, the present invention has been described in conjunction with the case wherein a front drag mechanism is provided at the front end of spool shaft 2 of the reel body 1. However, The present invention may be also applied to the case wherein a rear drag mechanism is provided in the back cover 9 at the rear end of the spool shaft 2. Of course, the use of both front and rear drag mechanisms can be possible within the scope of the present invention.

As apparent from the above description, the spool braking/releasing device of the present invention which apply a braking force to the spool shaft being in a free rotation state and releases the braking force applied to the spool shaft by the manipulation of the actuating lever comprises a braking movable member provided at the rear end of the spool shaft and adapted to move longitudinally of the spool shaft and an actuating lever adapted to move the movable member between its braking position and its releasing position and provided with a finger grip portion disposed just beneath the fishing rod so that the fisherman can manipulate the actuating lever by using his hand gripping the fishing rod. In accordance with the present invention, the actuating lever can be operated by the double manipulation thereof, so that a proper frictional resistance can be applied to the rotating spool shaft. Accordingly, it is possible to easily and rapidly shift the braking mechanism from its braking position to its releasing position, as well as to easily apply an instant braking force to the spool shaft prior to the manipulation of the handle, depending on the fishing condition. The use of the spool braking/releasing device of the present invention is convenient by virtue of simple manipulation thereof. Furthermore, there is no worry about an escaping of the fish and a backlash of the spool which may be caused by unskilled manipulation, thereby enabling the fishing efficiency to be improved.

Although the preferred embodiments of the invention have been disclosed for illustrative purpose, those skilled in the art will appreciated that various modifications, additions and substitutions are possible, without departing from the scope and spirit of the invention as disclosed in the accompanying claims.

What is claimed is:

1. A spool braking/releasing device of a fishing reel which comprises a reel body having a stem adapted to connect the reel body to a shoe for attaching the fishing reel to a fishing rod, a spool shaft extending longitudinally within said reel body, a handle, a drive gear disposed within the reel body and operatively connected to the handle so as to rotate according to the rotation of the handle and a cover plate constituting a side wall of the reel body, said device comprising:

a braking mechanism adapted to selectively brake the rotation of said spool shaft and including a fixed member fixedly mounted to the rear end of the reel body and a movable member connected to the rear end of the spool shaft to rotate together therewith and slide longitudinally of the spool shaft between a braking position at which it engages with said fixed member to brake the rotation of said spool shaft, a releasing position at which it allows the rotation of said spool shaft, and a frictional resistance position at which said movable member comes into frictional contact with said reel body to provide frictional resistance to the rotation of said spool shaft;

an actuating mechanism adapted to shift the braking mechanism between its braking position, its frictional resistance position and its releasing position and including an actuating lever arranged to be manipulated by the hand of fisherman gripping the fishing rod, an actuating lever connected to an actuating plate by means of a link, said actuating plate adapted to move the movable member of the braking mechanism, said actuating lever thereby capable of moving said link and said actuating plate in order to shift said movable member between said braking position, said releasing position, and said frictional resistance position.

2. A spool braking/releasing device in accordance with claim 1, wherein said fixed member of the braking mechanism is provided with a plurality of engaging grooves and said movable member of the braking mechanism is provided at its middle portion with a plurality of engaging protrusions selectively engagable in said engaging grooves of the fixed member, and said movable member furthermore is provided at its front portion with an angular contact piece which is selectively in contact with a braking washer provided at the inner surface of the reel body to apply the frictional resistance to the rotating movable member.

3. A spool braking/releasing device in accordance with claim 2, wherein said actuating plate of the actuating mechanism has a middle portion interposed between said contact piece and the engaging protrusions of the movable member, a lower end of said actuating plate supported to the lower surface of the reel body by means of a pivot so as to pivot the actuating plate forwardly and backwardly about said pivot, and arc-shaped front and rear contacts formed at both sides of the middle portion of movable member, protruded in opposition to each other and contactable to the contact piece and the engaging protrusions of the movable member, respectively.

4. A spool braking/releasing device in accordance with claim 1, wherein said actuating lever of the actuating mechanism has a curved middle portion pivotally supported to the middle portion of the stem of reel body and a finger grip portion disposed below the shoe of reel body.

5. A spool braking/releasing device in accordance 7ith claim 1, further comprising:
a return mechanism adapted to return the braking mechanism from its releasing position to its braking position according to the rotation of the handle, which in turn rotates the drive gear, and including a kicking plate disposed at the inner surface of the cover plate and adapted to operatively connect to the drive gear so as to selectively slide, a pair of rotation arms being rotated according to the sliding movement of said kicking plate so as to move the link and thus the actuating plate in the direction of forcing the movable member of the braking mechanism to slide to its braking position and the other being adapted to return the kicking plate to its original position.

* * * * *